United States Patent
Mamba et al.

(10) Patent No.: US 9,081,461 B2
(45) Date of Patent: Jul. 14, 2015

(54) DISPLAY DEVICE

(71) Applicant: Japan Display Inc., Tokyo (JP)

(72) Inventors: Norio Mamba, Kawasaki (JP); Yoshio Oowaki, Mobara (JP); Hiroshi Tabata, Ichihara (JP); Shinichi Iwasaki, Ichihara (JP)

(73) Assignee: JAPAN DISPLAY INC., Tokyo (JP)

( * ) Notice: Subject to any disclaimer, the term of this patent is extended or adjusted under 35 U.S.C. 154(b) by 115 days.

(21) Appl. No.: 13/764,873

(22) Filed: Feb. 12, 2013

(65) Prior Publication Data

US 2013/0207933 A1    Aug. 15, 2013

(30) Foreign Application Priority Data

Feb. 14, 2012    (JP) .................. 2012-029684

(51) Int. Cl.
*G09G 3/20* (2006.01)
*G06F 3/046* (2006.01)
*G02F 1/1345* (2006.01)
*G02F 1/1333* (2006.01)

(52) U.S. Cl.
CPC ............ *G06F 3/046* (2013.01); *G02F 1/13452* (2013.01); *G09G 3/20* (2013.01); *G02F 2001/133334* (2013.01); *G09G 2330/06* (2013.01)

(58) Field of Classification Search
CPC ..................... G09G 2330/06; G02F 1/13334
See application file for complete search history.

(56) References Cited

U.S. PATENT DOCUMENTS

| 2010/0073332 A1* | 3/2010 | Gettemy et al. ............... 345/204 |
| 2011/0267573 A1* | 11/2011 | Lee ............................. 349/150 |

FOREIGN PATENT DOCUMENTS

JP    2009-192976    8/2009

* cited by examiner

*Primary Examiner* — Gerald Johnson
*Assistant Examiner* — Christopher Kohlman
(74) *Attorney, Agent, or Firm* — Lowe Hauptman & Ham, LLP

(57) ABSTRACT

A display device includes a display panel, and a flexible printed circuit that is a wiring connected to a terminal on a glass substrate of the display panel, and transmitting an image signal. The display panel includes a master driver circuit element, a slave driver circuit element, and an inter-driver signal line that is a wiring on the glass substrate for conducting a communication between the master driver circuit element and the slave driver circuit element. The flexible printed circuit includes a connection terminal portion that is connected to the terminal on the glass substrate, and an electromagnetic wave blocking portion that extends from the connection terminal portion toward the display area side, and is arranged on the inter-driver signal line, and has a rear surface conductive pattern which is a planer conductive pattern formed on a surface facing the glass substrate.

7 Claims, 11 Drawing Sheets

DISPLAY DEVICE

CROSS-REFERENCE TO RELATED APPLICATION

The present application claims priority from Japanese application No. JP2012-029684 filed on Feb. 14, 2012, the content of which is hereby incorporated by reference into this application.

BACKGROUND OF THE INVENTION

1. Field of the Invention

The present invention relates to a display device.

2. Description of the Related Art

Liquid crystal display devices have been widely used as display devices for an information communication terminal such as a computer and a television receiver. Also, an organic EL display device (OLED) and a field emission display device (FED) have also been known as flat-screen display devices. A display panel of this flat-screen display device allows thin-film transistors (TFTs) formed in respective pixels in a display area on a glass substrate to operate, thereby conducting display. The TFTs of this type are driven by a plurality of driver circuit elements mounted outside of the display area on the glass substrate, and the driver circuit elements are normally controlled by a control circuit element on a flexible printed circuit (FPC) connected to the glass substrate.

The display device of this type is incorporated into a mobile terminal such as a cellular phone, and used as an output device to a user. However, most of the mobile terminals have a wireless communication function, and that electromagnetic waves radiated from the display device affect a wireless communication has been known.

JP 2009-192976 A discloses an electrooptical device having a flexible printed circuit in which a portion having a conductive pattern is stacked on a driver circuit by folding in order to reduce an influence of electromagnetic waves radiated from the driver circuit elements, or electromagnetic waves entering the driver circuit elements.

SUMMARY OF THE INVENTION

In recent years, a mobile terminal in which a function of the control circuit element has been incorporated into the driver circuit elements has appeared according to a demand for downsizing or a reduction in the number of parts. When the driver circuit elements into which the function of the control circuit element has been incorporated are used, one master driver circuit element and at least one slave driver circuit element are established, and the slave driver circuit element is controlled by the master driver circuit element. In this case, the master driver circuit element and the slave driver circuit element are connected to each other by a signal line on the glass substrate, and synchronization signals are transmitted from the master driver circuit element to the slave driver circuit element. The synchronization signals include a plurality of signals having several tens Hz to several MHz, resulting in a concern that the synchronization signals may generate harmonic electromagnetic waves, and affect a receive band of the mobile terminal.

It is conceivable that the flexible printed circuit disclosed in JP 2009-192976 A is effective in preventing the electromagnetic waves. However, there is a risk that the durability is insufficient because of the existence of the folded portion. Also, it is conceivable that the manufacturing costs increase due to the complicated shape.

The present invention has been made in view of the above-mentioned circumstances, and aims at providing a display device that can block electromagnetic waves even if a communication is conducted at a high frequency in a signal line between driver circuit elements on a glass substrate.

According to the present invention, there is provided a display device including: a display panel that includes a glass substrate as a base material and that conducts a display control according to a gradation value on each pixel in a display area; and a flexible printed circuit that is a wiring connected to a terminal on the glass substrate of the display panel, and transmitting an image signal, in which the display panel includes: one master driver circuit element that is disposed outside of the display area, and applies a voltage corresponding to the gradation value to each pixel in the display area; at least one slave driver circuit element that is disposed outside of the display area, operates according to a command of the master driver circuit element, and applies a voltage corresponding to the gradation value to each pixel in the display area; and an inter-driver signal line that is a wiring on the glass substrate for conducting a communication between the master driver circuit element and the slave driver circuit element, and in which the flexible printed circuit includes: a connection terminal portion that is a plurality of terminals connected to the terminal on the glass substrate; and an electromagnetic wave blocking portion that is arranged to extend from the connection terminal portion toward the display area side, and to cover the inter-driver signal line, and has a rear surface conductive pattern which is a planer conductive pattern formed on a surface facing the glass substrate.

Also, according to the present invention, in the display device, a ground terminal of the master driver circuit element and a ground terminal of the slave driver circuit element are connected to a common terminal by the wiring on the glass substrate, and the common terminal is electrically connected to a part of the connection terminal portion connected to the rear surface conductive pattern.

Also, according to the present invention, the display device further includes a color filter substrate that transmits a light in a given wavelength range for each pixel in the display area, in which the electromagnetic wave blocking portion of the flexile printed circuit extends to the color filter substrate, and the rear surface conductive pattern of the electromagnetic wave blocking portion is connected to a ground potential line of the color filter substrate.

Also, according to the present invention, in the display device, the flexible printed circuit further includes a driver circuit element electromagnetic wave blocking portion that extends together with the rear surface conductive pattern from the electromagnetic wave blocking portion so as to cover the master driver circuit element and the slave driver circuit element.

Also, according to the present invention, in the display device, the flexible printed circuit further includes a folded portion that is symmetrical with respect to the connection terminal portion of the electromagnetic wave blocking portion, and folded back on a rear side of the display panel by cutting so as to surround three directions except for the connection terminal portion side, the folded portion includes a folded portion conductive pattern that is formed on the same surface as that of the rear surface conductive pattern, and electrically connected to the rear surface conductive pattern, and the folded portion is so folded as to sandwich the display panel, and arranged to cover a position corresponding to the wiring on the glass substrate on a rear surface side of the display panel.

Also, according to the present invention, in the display device, the electromagnetic wave blocking portion of the flexible printed circuit includes a front surface conductive pattern which is a conductive pattern formed on a surface that does not face the glass substrate, and the front surface conductive pattern and the rear surface conductive pattern are electrically connected to each other through a through-hole.

Also, according to the present invention, in the display device, the front surface conductive pattern is electrically connected to a housing that covers the glass substrate.

Also, according to the present invention, the display device further includes: a color filter substrate that passes a light in a given wavelength range for each pixel; and a tape member for connecting the front surface conductive pattern to a ground potential line of the color filter substrate.

DETAILED DESCRIPTION OF THE INVENTION

Figure 1:
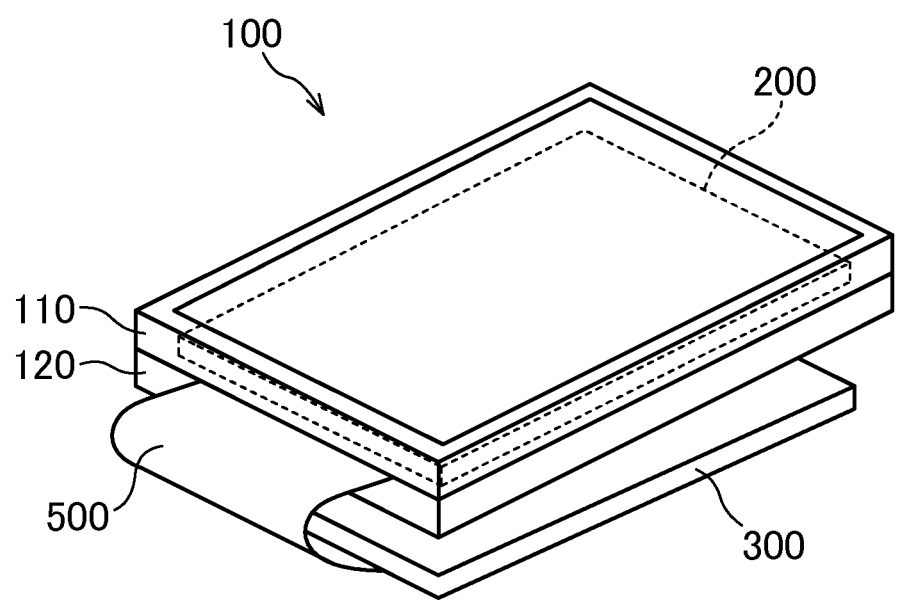
FIG. 1 is a diagram illustrating a display device according to a first embodiment of the present invention.

Hereinafter, embodiments of the present invention will be described with reference to the accompanying drawings. In the drawings, the same or equivalent elements are denoted by identical reference numerals, and a repetitive description will be omitted.

First Embodiment

FIG. 1 is a diagram illustrating a display device 100 according to a first embodiment of the present invention. In this example, the display device 100 according to this embodiment is a liquid crystal display device, but may be any display device such as an organic EL (electro-luminescent) display device if a driver circuit element is arranged on a glass substrate to conduct a display control. As illustrated in FIG. 1, the display device 100 includes an upper frame 110 and a lower frame 120 which are fixed to sandwich a display panel 200, an image signal control unit 300 that converts image information into a format that can be displayed on the display panel 200 according to a command from a main control unit not shown, and a flexible printed circuit (FPC) 500 that transmits the information converted in the image signal control unit 300 to the display panel 200.

Figure 2:
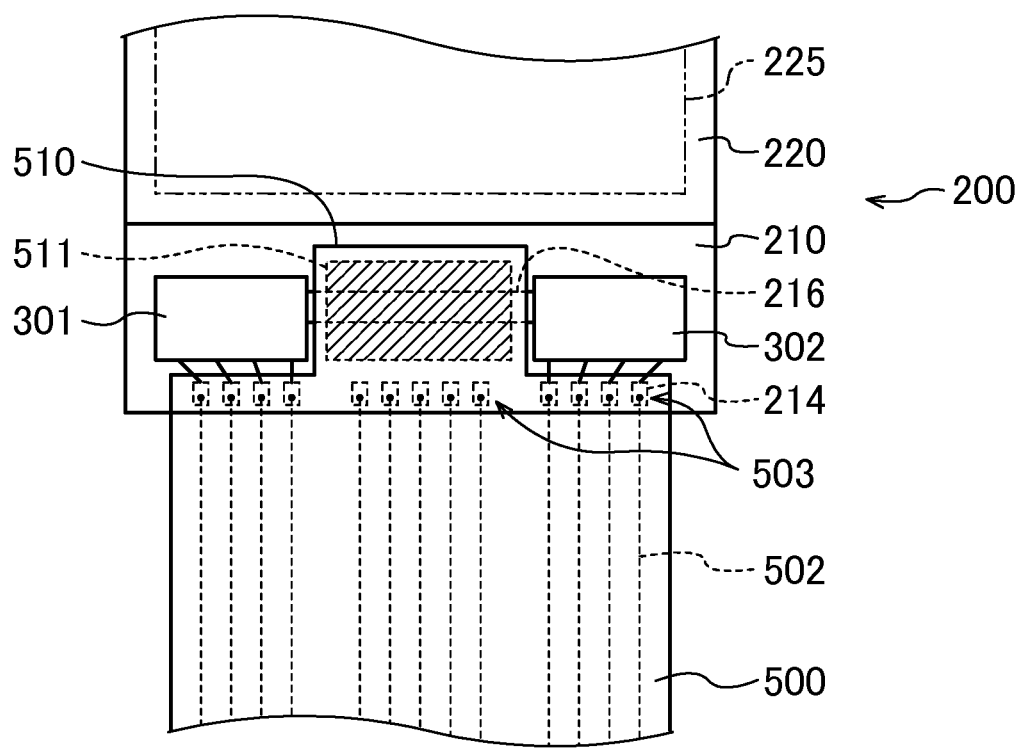
FIG. 2 is a diagram illustrating a neighborhood of a connection portion between a display panel and a flexible printed circuit (FPC) in FIG. 1 in detail.

FIG. 2 is a diagram illustrating a neighborhood of a connection portion between the display panel 200 and the flexible printed circuit 500 in FIG. 1 in detail. As illustrated in the figure, the display panel 200 includes a TFT substrate 210 on which thin-film transistors (TFT) are formed, and a color filter substrate 220 including color filters for respective colors of RGB for each pixel, placed to cover a display area of the TFT substrate 210, and holding a liquid crystal composition therebetween. The display panel 200 also includes a master driver circuit element 301 having a function of a timing controller, outputting a signal for display on the respective pixels in the display area according to the timing, and giving an instruction of the timing to a slave driver circuit element 302 to be described later, and the slave driver circuit element 302 outputting a signal for display on the respective pixels in the display area according to the instruction from the master driver circuit element 301.

In this example, the master driver circuit element 301 and the slave driver circuit element 302 are mounted on a glass substrate of the TFT substrate 210. On the glass substrate are formed inter-driver signal lines 216 used for a communication between the master driver circuit element 301 and the slave driver circuit element 302, and a plurality of substrate terminals 214 for connecting terminals of the master driver circuit element 301 and the slave driver circuit element 302 to wirings of the flexible printed circuit 500 through wirings on the glass substrate.

Also, the flexible printed circuit 500 includes flexible printed circuit signal lines 502 for transmitting an image signal to the substrate, and a connection terminal portion 503 that is connected to the TFT substrate terminals 214 with the use of an anisotropic conductive film (ACF). The flexible printed circuit 500 further includes an electromagnetic wave blocking portion 510 that extends to cover the inter-driver signal lines 216 on a display area 225 side from the connection terminal portion 503. A rear surface conductive pattern 511 which is a planar conductive pattern for blocking electromagnetic waves is formed on a rear surface side of the electromagnetic wave blocking portion 510, which faces the TFT substrate 210. In this example, the rear surface conductive pattern 511 has a ground potential.

With the above configuration, even if a communication is conducted between the master driver circuit element 301 and the slave driver circuit element 302 at a high frequency in the inter-driver signal lines 216, the electromagnetic waves can be blocked by the rear surface conductive pattern 511 of the electromagnetic wave blocking portion 510 with a high reliability.

Figure 3:
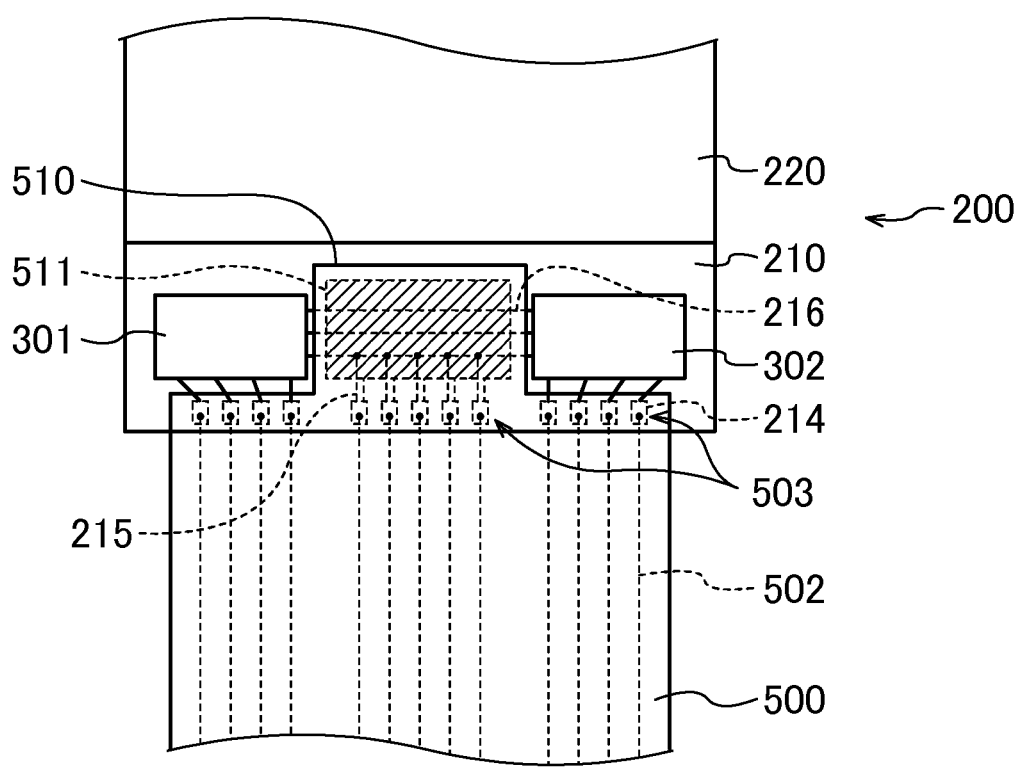
FIG. 3 is a diagram illustrating the neighborhood of the connection portion between the display panel and the flexible printed circuit according to a modified example of the first embodiment in detail.

FIG. 3 illustrates a modified example of the above-mentioned first embodiment. A difference from the first embodiment resides in that ground potential lines 215 that connect the ground potentials of the master driver circuit element 301 and the slave driver circuit element 302 are wired on the glass substrate of the TFT substrate 210, and are connected to a part of the plurality of terminals 214 on the glass substrate. The substrate terminals 214 connected with the ground potential lines 215 are connected to the connection terminal portion 503 of the flexible printed circuit 500 by the anisotropic conductive film as with the other substrate terminals 214. Also, because the terminals of the connection terminal portion 503 electrically connected with the ground potential lines 215 are connected to the rear surface conductive pattern 511, the ground potential of the master driver circuit element 301 and the slave driver circuit element 302 is common with the potential of the rear surface conductive pattern 511. With the above configuration, because the ground potential is more stabilized, signals can be stably transmitted and received between the respective elements.

Second Embodiment

Figure 4:
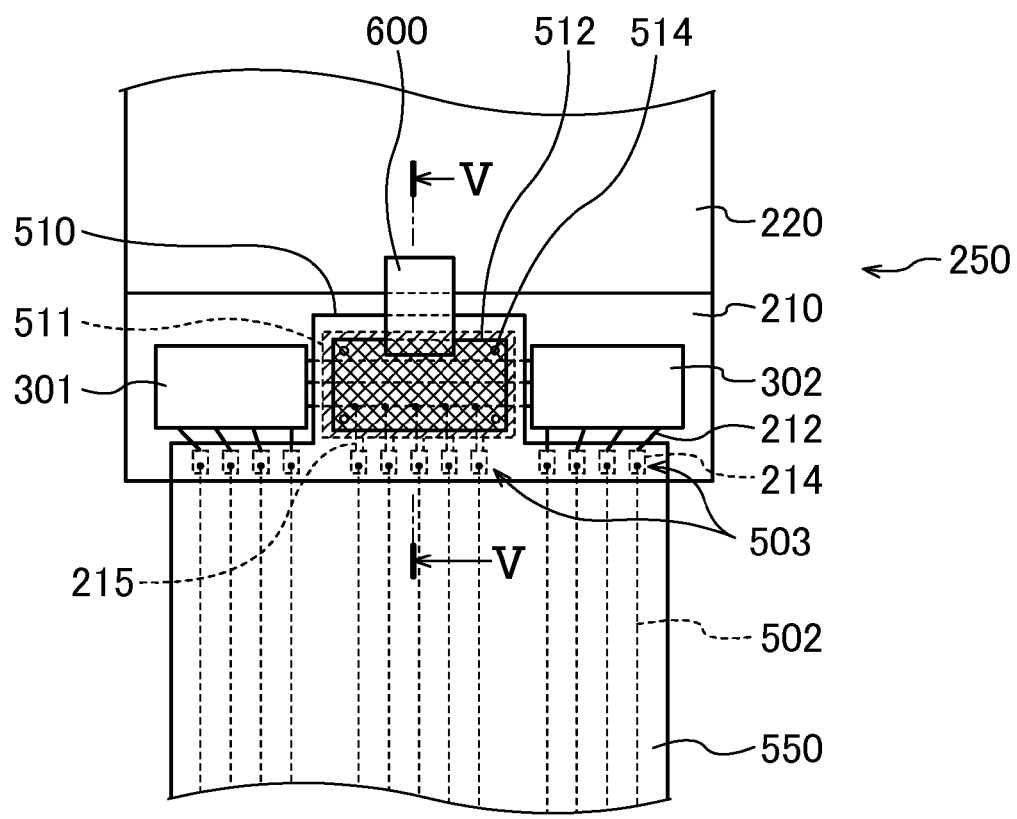
FIG. 4 is a diagram illustrating a neighborhood of a connection portion between a display panel and a flexible printed circuit in a display device according to a second embodiment of the present invention in detail.
Figure 5:
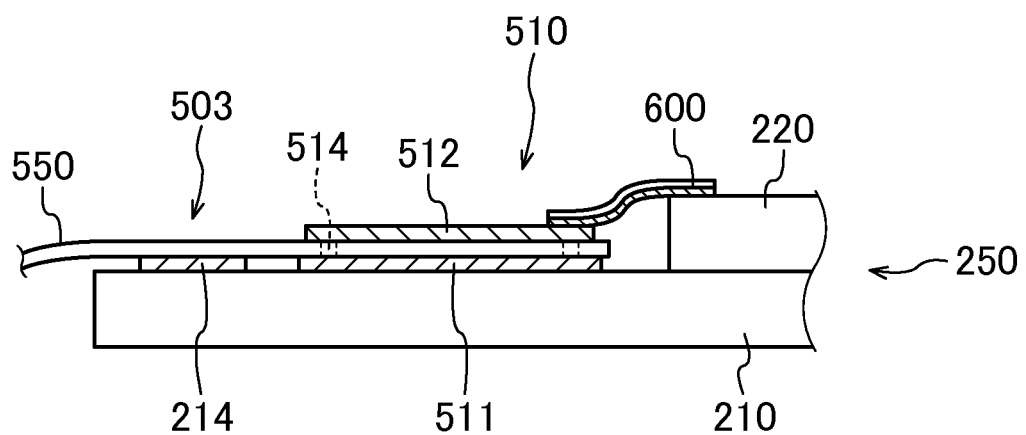
FIG. 5 is a cross-sectional view taken along a line V-V in FIG. 4.

FIG. 4 is a diagram illustrating a neighborhood of a connection portion between a display panel 250 and a flexible printed circuit 550 in a display device according to a second embodiment of the present invention in detail. FIG. 5 is a cross-sectional view taken along a line V-V in FIG. 4. The display device according to the second embodiment is substantially identical with that in the above-mentioned modified example of the first embodiment illustrated in FIG. 3. Differences from the modified example of the first embodiment reside in that a front surface conductive pattern 512 which is a conductive pattern is disposed on a front surface side of the electromagnetic wave blocking portion 510, which does not face the TFT substrate 210, the front surface conductive pattern 512 and the rear surface conductive pattern 511 are electrically connected to each other through through-holes 514, and the front surface conductive pattern 512 is connected to the ground potential line of the color filter substrate 220 by a conductive tape 600.

Even with the above configuration, the electromagnetic waves occurring in the inter-driver signal lines 216 can be blocked by the rear surface conductive pattern 511 and the front surface conductive pattern 512 of the electromagnetic wave blocking portion 510. Also, the ground potential of the master driver circuit element 301 and the slave driver circuit element 302, the potential of the front surface conductive pattern 512 and the rear surface conductive pattern 511, and the ground potential of the color filter substrate 220 can be made common with each other. As a result, the more stable ground potential can be provided.

Third Embodiment

Figure 6:
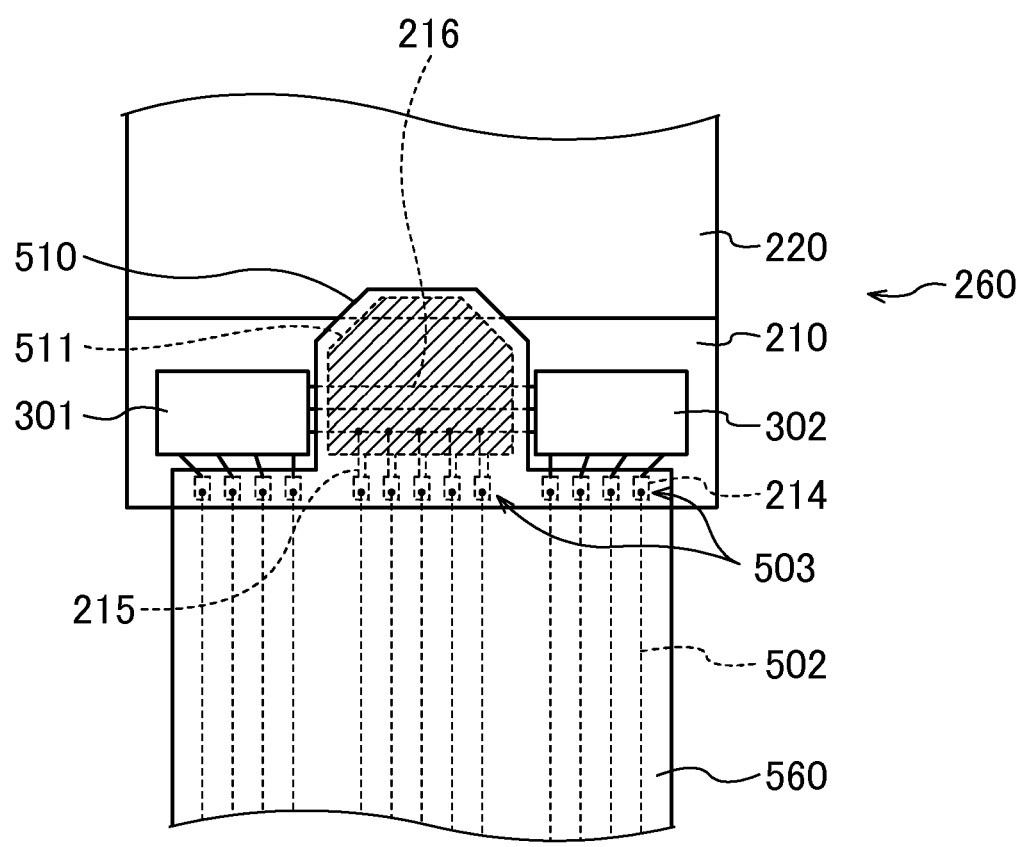
FIG. 6 is a diagram illustrating a neighborhood of a connection portion between a display panel and a flexible printed circuit in a display device according to a third embodiment of the present invention in detail.

FIG. 6 is a diagram illustrating a neighborhood of a connection portion between a display panel 260 and a flexible printed circuit 560 in a display device according to a third embodiment of the present invention in detail. This embodiment is different from the second embodiment in that the front surface conductive pattern 512 of the second embodiment is not provided, but the electromagnetic wave blocking portion 510 and the rear surface conductive pattern 511 are further extended in a direction of the display area, and connected to the ground potential line of the color filter substrate 220. Other configurations are identical with those in the second embodiment. Even with this configuration, the electromagnetic waves occurring in the inter-driver signal lines 216 can be blocked by the rear surface conductive pattern 511 of the electromagnetic wave blocking portion 510. Also, the ground potential of the master driver circuit element 301 and the slave driver circuit element 302, the potential of the rear surface conductive pattern 511, and the ground potential of the color filter substrate 220 can be made common with each other. As a result, the more stable ground potential can be provided.

Fourth Embodiment

Figure 7:
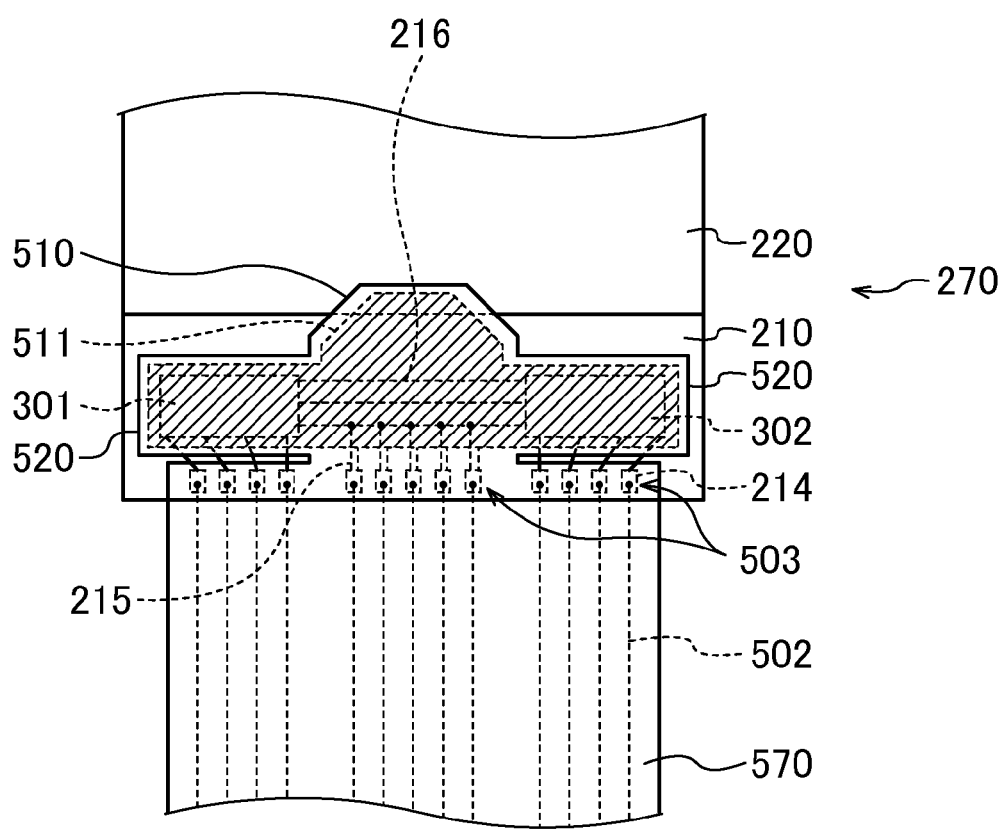
FIG. 7 is a diagram illustrating a neighborhood of a connection portion between a display panel and a flexible printed circuit in a display device according to a fourth embodiment of the present invention in detail.

FIG. 7 is a diagram illustrating a neighborhood of a connection portion between a display panel 270 and a flexible printed circuit 570 in a display device according to a fourth embodiment of the present invention in detail. In this embodiment, for the purpose of blocking the electromagnetic waves radiated directly from the master driver circuit element 301 and the slave driver circuit element 302, there is provided a driver circuit element electromagnetic wave blocking portion 520 that extends together with the rear surface conductive pattern 511 from the electromagnetic wave blocking portion 510 in a direction orthogonal to a direction of extending the flexible printed circuit 570 so as to cover the master driver circuit element 301 and the slave driver circuit element 302.

With the above configuration, not only the electromagnetic waves radiated from the inter-driver signal lines 216 formed on the glass substrate of the TFT substrate 210, but also the electromagnetic waves radiated from the master driver circuit element 301 and the slave driver circuit element 302 can be suppressed.

As illustrated in the figure, the driver circuit element electromagnetic wave blocking portion 520 is not formed continuously to the connection terminal portion 503 which is located at a position corresponding to the driver circuit element electromagnetic wave blocking portion 520, but formed to be cut from the electromagnetic wave blocking portion 510. That is because the master driver circuit element 301 and the slave driver circuit element 302 are each high in level, and therefore a design is made so that no stress is exerted on a material of the flexible printed circuit 570. However, if this design is not required, the driver circuit element electromagnetic wave blocking portion 520 may be formed continuously to the connection terminal portion 503.

Fifth Embodiment

Figure 8:
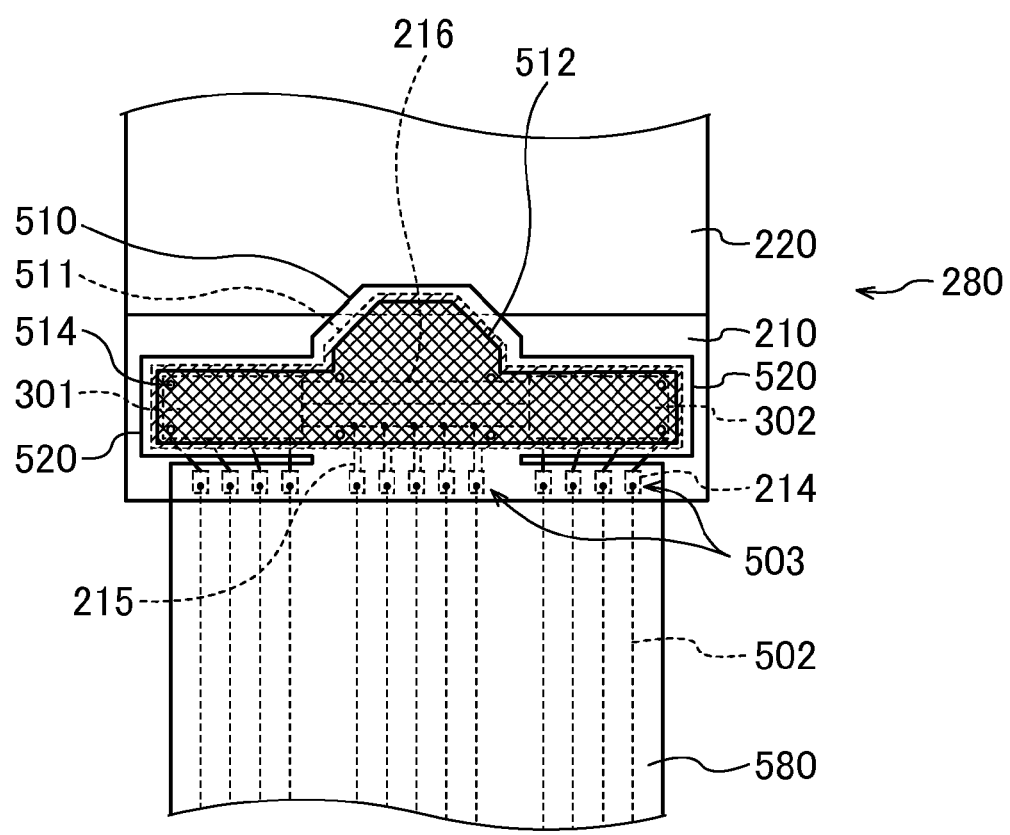
FIG. 8 is a diagram illustrating a neighborhood of a connection portion between a display panel and a flexible printed circuit in a display device according to a fifth embodiment of the present invention in detail.

FIG. 8 is a diagram illustrating a neighborhood of a connection portion between a display panel 280 and a flexible printed circuit 580 in a display device according to a fifth embodiment of the present invention in detail. The flexible printed circuit 580 of the fifth embodiment is different from that of the fourth embodiment in that the front surface conductive pattern 512 is formed on the front surface of the electromagnetic wave blocking portion 510 and the driver circuit element electromagnetic wave blocking portion 520 in addition to the rear surface conductive pattern 511 formed on the electromagnetic wave blocking portion 510 and the driver circuit element electromagnetic wave blocking portion 520. The front surface conductive pattern 512 is electrically connected to the rear surface conductive pattern 511 through the through-holes 514, and the front surface conductive pattern 512 is connected to a metal frame that covers the display panel by a gasket or the like. With the above configuration, not only the electromagnetic waves radiated from the inter-driver signal lines 216 can be blocked, but also the electromagnetic waves radiated from the master driver circuit element 301 and the slave driver circuit element 302 can be suppressed, by the rear surface conductive pattern 511 and the front surface conductive pattern 512 of the electromagnetic wave blocking portion 510. Further, because the ground potential can be shared by the metal frame, the ground potential can be more stabilized.

Sixth Embodiment

Figure 9:
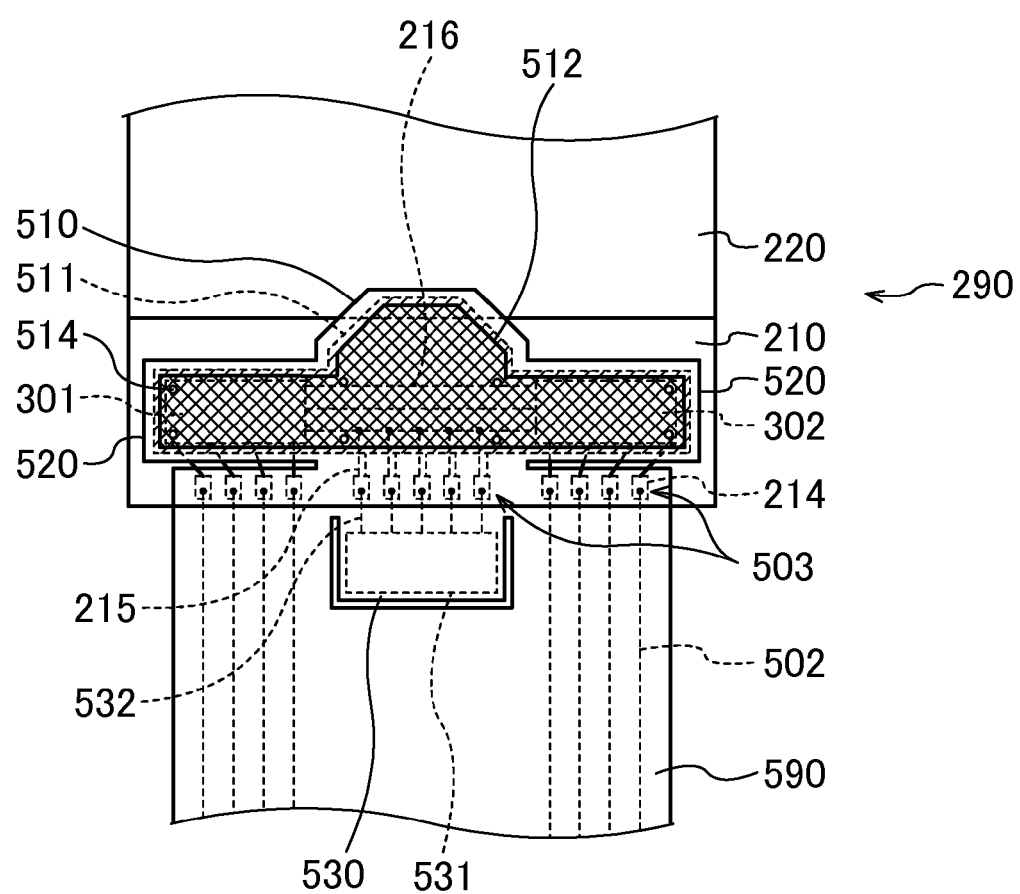
FIG. 9 is a diagram illustrating a neighborhood of a connection portion between a display panel and a flexible printed circuit in a display device according to a sixth embodiment of the present invention in detail.

FIG. 9 is a diagram illustrating a neighborhood of a connection portion between a display panel 290 and a flexible printed circuit 590 in a display device according to a sixth embodiment of the present invention in detail. The flexible printed circuit 590 of the sixth embodiment is different from the flexible printed circuit 580 of the fifth embodiment in that there is provided a folded portion 530 that is symmetrical with respect to the connection terminal portion 503 of the electromagnetic wave blocking portion 510, and is so cut as to surround three directions except for the connection terminal portion 503 side. The folded portion 530 includes a folded portion conductive pattern 531 on the rear surface side, and the folded portion conductive pattern 531 is connected with a wiring extending from the terminals of the connection terminal portion 503, which are connected to the terminals of the ground potential, to hold a common ground potential.

Figure 10:
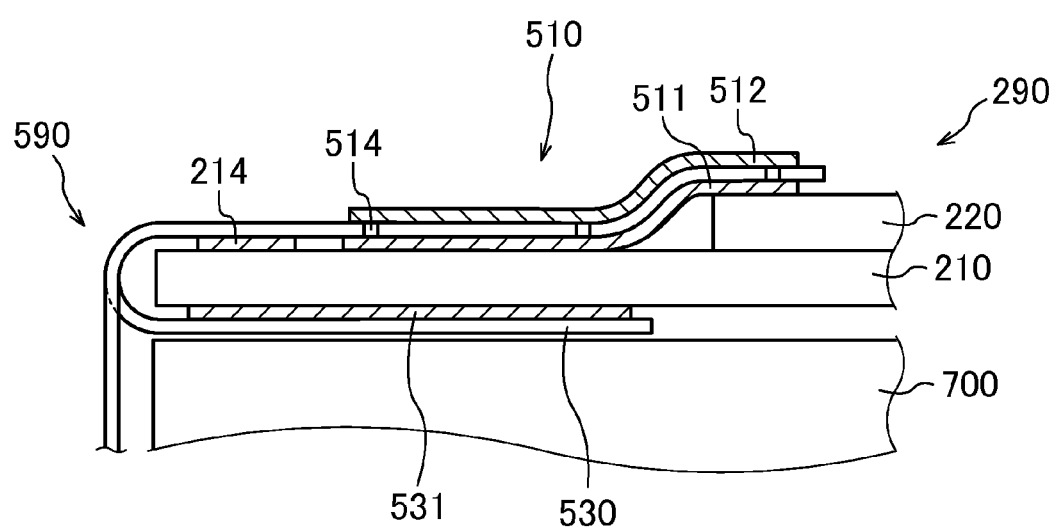
FIG. 10 is a cross-sectional view illustrating a state in which the display panel and the flexible printed circuit in FIG. 9 are arranged together with a backlight.

FIG. 10 is a cross-sectional view illustrating a state in which the display panel 290 and the flexible printed circuit 590 are arranged together with a backlight 700 in the display device according to this embodiment. As illustrated in the figure, during assembling, the folded portion 530 is folded back on a rear side so as to sandwich the display panel 290, and the folded portion conductive pattern 531 is arranged at a position corresponding to the inter-driver signal lines 216. Also, the other portion of the flexible printed circuit 590 is assembled to be folded back on the rear side of the backlight 700. With this configuration, the electromagnetic waves of the inter-driver signal lines 216 which are radiated from the rear surface side of the display panel 290 can be reduced, and springback (resistance for returning to an original shape) of a portion folded by the backlight 700 can be reduced.

Seventh Embodiment

Figure 11:
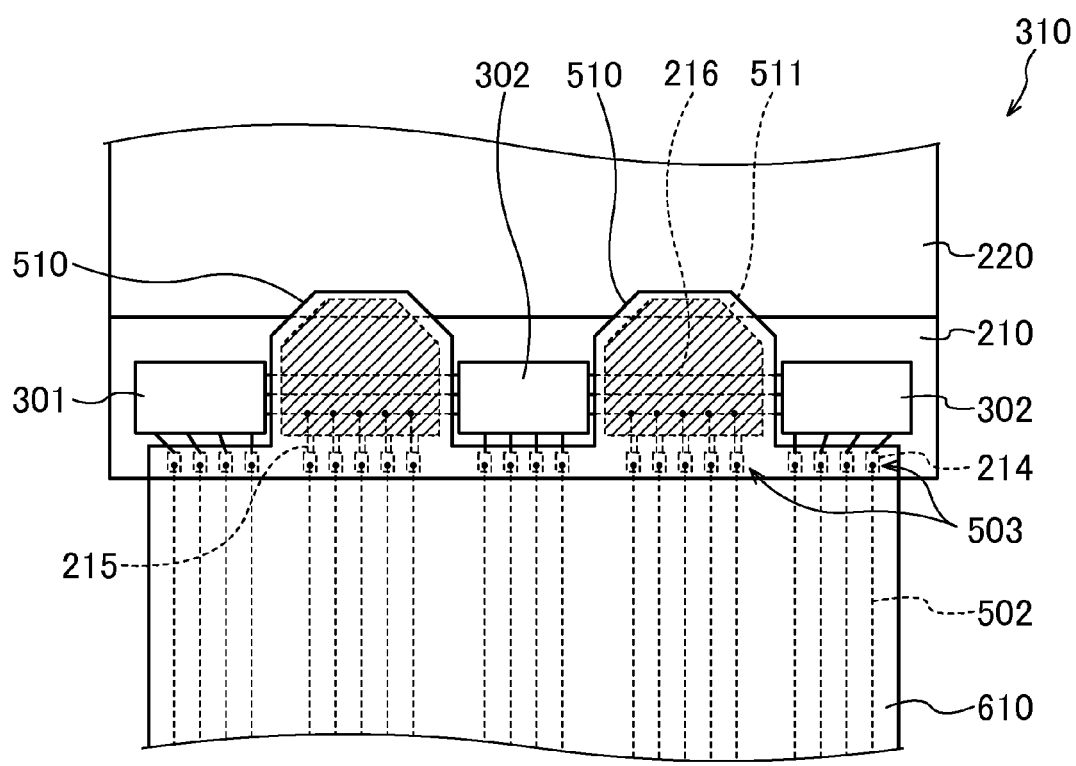
FIG. 11 is a diagram illustrating the neighborhood of the connection portion between the display panel and the flexible printed circuit in the configuration according to the third embodiment of the present invention when two slave driver circuit elements are provided.

FIG. 11 is a diagram illustrating a neighborhood of a connection portion between a display panel 310 and a flexible printed circuit 610 in a display device according to a seventh embodiment of the present invention in detail. In the above-mentioned respective first to sixth embodiments, one slave driver circuit element 302 is provided. However, even if two or more slave driver circuit elements 302, that is, three or more driver circuit elements in total are provided, the same configuration as that in the respective embodiments can be provided. FIG. 11 illustrates a configuration in which two slave driver circuit elements 302 are provided, and the configurations of the respective portions such as the electromagnetic wave blocking portion 510 are identical with those illustrated in the third embodiment. Even with this configuration, the electromagnetic waves occurring in the inter-driver signal lines 216 can be blocked by the rear surface conductive pattern 511 of the electromagnetic wave blocking portion 510. Also, the ground potential of the master driver circuit element 301 and the slave driver circuit elements 302, the potential of the front surface conductive pattern 512 and the rear surface conductive pattern 511, and the ground potential of the color filter substrate 220 can be made common with each other. As a result, the more stable ground potential can be provided. In the seventh embodiment, the configurations of the respective portions in the third embodiment are used. Alternatively, the configurations of the respective portions in the other embodiments may be used.

Accordingly, in the above-mentioned respective embodiments, even if a communication is conducted in the signal lines between the driver circuit elements on the glass substrate at a high frequency, the electromagnetic waves can be blocked with a higher reliability. In particular, in the terminal having a wireless communication function, the electromagnetic waves that jam the wireless communication can be prevented.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display device comprising:
a display panel that includes a glass substrate as a base material and that conducts a display control based on a gradation value on each pixel in a display area; and
a flexible printed circuit that is a wiring connected to a terminal on the glass substrate of the display panel, and transmitting an image signal,
wherein the display panel includes:
one master driver circuit element that is disposed outside of the display area, and applies a voltage corresponding to the gradation value to each pixel in the display area;
at least one slave driver circuit element that is disposed outside of the display area, operates according to a command of the master driver circuit element, and applies a voltage corresponding to the gradation value to each pixel in the display area; and
an inter-driver signal line that is a wiring on the glass substrate for conducting a communication between the master driver circuit element and the slave driver circuit element,
wherein the flexible printed circuit includes:
a connection terminal portion that is a plurality of terminals connected to the terminal on the glass substrate; and
an electromagnetic wave blocking portion that is arranged to extend from the connection terminal portion toward the display area side, and to cover the inter-driver signal line, and has a rear surface conductive pattern which is a planer conductive pattern formed on a surface facing the glass substrate,
wherein a ground terminal of the master driver circuit element and a ground terminal of the slave driver circuit element are connected to a common terminal by the wiring on the glass substrate, and
wherein the common terminal is electrically connected to a part of the connection terminal portion connected to the rear surface conductive pattern.

2. A display device comprising:
a display panel that includes a glass substrate as a base material and that conducts a display control based on a gradation value on each pixel in a display area; and
a flexible printed circuit that is a wiring connected to a terminal on the glass substrate of the display panel, and transmitting an image signal,
wherein the display panel includes:
one master driver circuit element that is disposed outside of the display area, and applies a voltage corresponding to the gradation value to each pixel in the display area;

at least one slave driver circuit element that is disposed outside of the display area, operates according to a command of the master driver circuit element, and applies a voltage corresponding to the gradation value to each pixel in the display area; and an inter-driver signal line that is a wiring on the glass substrate for conducting a communication between the master driver circuit element and the slave driver circuit element, a color filter substrate that transmits a light in a given wavelength range for each pixel in the display area, wherein the flexible printed circuit includes:

a connection terminal portion that is a plurality of terminals connected to the terminal on the glass substrate; and an electromagnetic wave blocking portion that is arranged to extend from the connection terminal portion toward the display area side, and to cover the inter-driver signal line, and has a rear surface conductive pattern which is a planer conductive pattern formed on a surface facing the glass substrate, wherein the electromagnetic wave blocking portion of the flexible printed circuit extends to the color filter substrate, and wherein the rear surface conductive pattern of the electromagnetic wave blocking portion is connected to a ground potential line of the color filter substrate.

3. The display device according to claim 1, wherein the flexible printed circuit further includes a driver circuit element electromagnetic wave blocking portion that extends together with the rear surface conductive pattern from the electromagnetic wave blocking portion so as to cover the master driver circuit element and the slave driver circuit element.

4. The display device according to claim 1, wherein the flexible printed circuit further includes a folded portion that is symmetrical with respect to the connection terminal portion of the electromagnetic wave blocking portion, and folded back on a rear side of the display panel by cutting so as to surround three directions except for the connection terminal portion side, wherein the folded portion includes a folded portion conductive pattern that is formed on the same surface as that of the rear surface conductive pattern, and electrically connected to the rear surface conductive pattern, and wherein the folded portion is folded to sandwich the display panel, and arranged to cover a position corresponding to the wiring on the glass substrate on a rear surface side of the display panel.

5. A display device comprising:

a display panel that includes a glass substrate as a base material and that conducts a display control based on a gradation value on each pixel in a display area; and a flexible printed circuit that is a wiring connected to a terminal on the glass substrate of the display panel, and transmitting an image signal, wherein the display panel includes:

one master driver circuit element that is disposed outside of the display area, and applies a voltage corresponding to the gradation value to each pixel in the display area;

at least one slave driver circuit element that is disposed outside of the display area, operates according to a command of the master driver circuit element, and applies a voltage corresponding to the gradation value to each pixel in the display area; and an inter-driver signal line that is a wiring on the glass substrate for conducting a communication between the master driver circuit element and the slave driver circuit element, wherein the flexible printed circuit includes:

a connection terminal portion that is a plurality of terminals connected to the terminal on the glass substrate; and an electromagnetic wave blocking portion that is arranged to extend from the connection terminal portion toward the display area side, and to cover the inter-driver signal line, and has a rear surface conductive pattern which is a planer conductive pattern formed on a surface facing the glass substrate, wherein the electromagnetic wave blocking portion of the flexible printed circuit includes a front surface conductive pattern which is a conductive pattern formed on a surface that does not face the glass substrate, and wherein the front surface conductive pattern and the rear surface conductive pattern are electrically connected to each other through a through-hole.

6. The display device according to claim 5, wherein the front surface conductive pattern is electrically connected to a housing that covers the glass substrate.

7. The display device according to claim 5, further comprising:

a color filter substrate that passes a light in a given wavelength range for each pixel; and a tape member for connecting the front surface conductive pattern to a ground potential line of the color filter substrate.

* * * * *